(12) United States Patent
Keller

(10) Patent No.: US 6,852,267 B1
(45) Date of Patent: Feb. 8, 2005

(54) METHOD FOR PRODUCING TUBULAR CONTAINERS

(75) Inventor: Gerhard Keller, Jongny (CH)

(73) Assignee: Aisa Automation Industrielle SA, Vouvry (CH)

( * ) Notice: Subject to any disclaimer, the term of this patent is extended or adjusted under 35 U.S.C. 154(b) by 424 days.

(21) Appl. No.: 10/168,514

(22) PCT Filed: Jun. 2, 2000

(86) PCT No.: PCT/EP00/05082
§ 371 (c)(1),
(2), (4) Date: Jun. 21, 2002

(87) PCT Pub. No.: WO00/74924
PCT Pub. Date: Dec. 14, 2000

(30) Foreign Application Priority Data
Jun. 4, 1999 (DE) ......................................... 199 25 695

(51) Int. Cl.[7] .............................................. B29C 49/14
(52) U.S. Cl. ........................ 264/454; 264/455; 264/456; 264/474; 264/509; 264/521; 264/529; 264/532; 264/536; 264/154
(58) Field of Search ............................. 264/454, 455–6, 264/474, 509, 521, 529, 532, 536, 154

(56) References Cited

U.S. PATENT DOCUMENTS 3,855,380 A  12/1974  Niemi et al.
4,151,247 A * 4/1979  Hafele .................... 264/328.16
4,782,728 A  11/1988  Thatcher
4,988,399 A  1/1991  Watson et al.

FOREIGN PATENT DOCUMENTS

DE   37 04 264   8/1988
NL   279 815     11/1964

* cited by examiner

Primary Examiner—Suzanne E. McDowell
(74) Attorney, Agent, or Firm—Collard & Roe, P.C.

(57) ABSTRACT

The invention relates to a method for producing tubular containers with an open filling opening and with an end that is provided with a seal. The inventive method comprises the following steps: separately producing a preform with a neck with definitive dimensions and a tubular body with smaller dimensions than the definitive form, the tubular body containing the open filling opening; fixing the preform that is produced to a drawing head by its neck and subjecting it to at least one partial heating process; introducing the heated preform that is attached to the drawing head into the inside of a multi-part closed blow mold in such a way that the open filling opening is air-tightly held at the lower end of the blow mold; fitting a blow nozzle to the filling opening of the preform.

12 Claims, 13 Drawing Sheets

METHOD FOR PRODUCING TUBULAR CONTAINERS

CROSS REFERENCE TO RELATED APPLICATIONS

Applicant claims priority under 35 U.S.C. §119 of German Application No. 199 25 695.0 filed Jun. 4, 1999. Applicant also claims priority under 35 U.S.C. §365 of PCT/EP01/05082 filed Jun. 2, 2000. The international application under PCT article 21(2) was not published in English.

The invention relates to a process for producing tubular containers by separately producing a preform including a neck having final dimensions and a tubular body having smaller dimensions than the intended final form, to heating the preform, fitting the preform to a drawing head in the neck region, introducing the preform, including the drawing head, into the interior of a multi-part closable blow mould, axial drawing of the preform by means of the drawing head and expanding the preform by supplying blowing air into the interior, hardening the container closely fitting against the wall of the blow mould, opening the blow mould and removing the container, as is known from U.S. Pat. No. 4,988,399.

According to this known process two identical container portions are manufactured in one single step by the central separation from an intermediate moulding produced from a preform open on both sides, whereupon both container portions are made into finished containers, each being provided with a bottom.

From DE 37 04 264 A1 the production of a plastics hollow body is known, open at the one end and closed at the other. In this case two entirely different techniques such as injection-moulding on the one hand and blow moulding on the other, are performed on one single machine, in which context it must be taken into account that for injection-moulding substantially longer times are required than for blow moulding, which has an effect on the joint production in a single machine. By means of a nozzle a tube is withdrawn continually by removing a withdrawal device from the nozzle supplying the plastics, the said tube already being expanded somewhat in the process by the blowing air supplied. Only when the closable blow mould components can be sealed, i.e. when an adequate spacing between the withdrawal device and the nozzle exists, through which the supply of plastics and blowing air takes place, is blowing air supplied alone in order to expand the extruded tube section.

It is the object of the invention to provide a process for the production of tubular resealable containers comprising closures permitting in a simple manner to manufacture any desired shape of tubular containers, even with a closed discharge aperture.

The object is attained by a process having the characteristics according to claim 1.

Advantageous embodiments of the invention are apparent from the subsidiary claims.

The invention is elucidated in detail in what follows by way of embodiments with reference to the drawings. There is shown in.

Figure 1A:
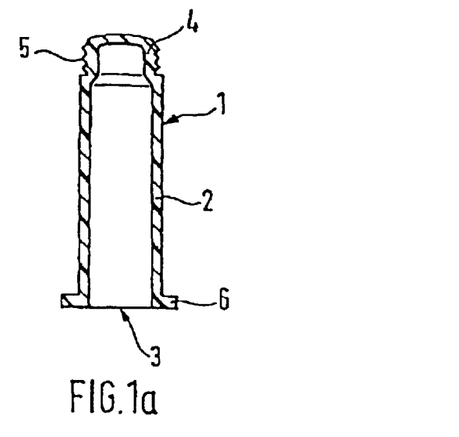
FIG. 1 a variety of preforms, including also those having an external flange.
Figure 1B:
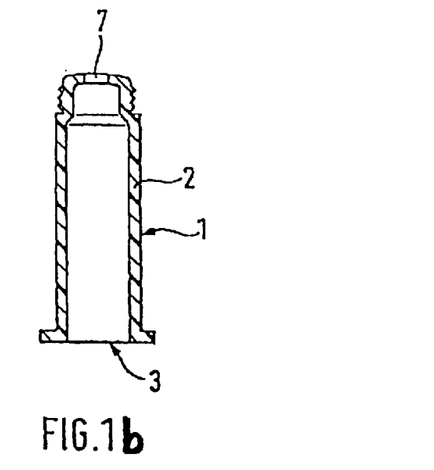
Figure 1C:
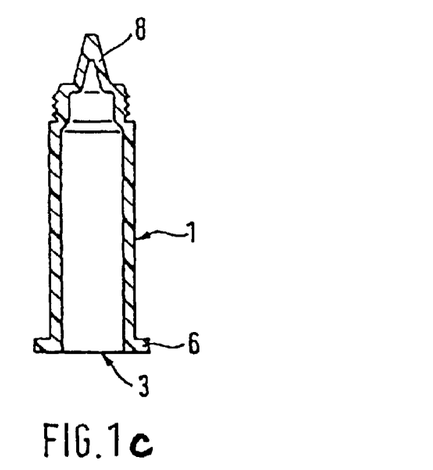

FIG. 1 shows three preforms, each of which is manufactured in separate processes. In FIG. 1a the preform 1 comprises a tubular body 2 having an open end 3. At the other end the tubular body 2 includes a neck 4 having the dimensions required for the finished container, which have to be complied with by the preform in an extremely precise and reproducible manner, this being of particular importance for closures. In the preform illustrated in FIG. 1a the neck 4 is sealed and comprises an external thread 5, its tubular body 2 comprising an external, annular flange 6 at its open end 3. The preform shown in FIG. 1b corresponds to that shown in FIG. 1a, except that it has a central discharge aperture 7 in the neck 4. The embodiment shown in FIG. 1c corresponds to that shown in FIG. 1a, the neck likewise being sealed, but comprising a conical nozzle 8.

Figure 2A:
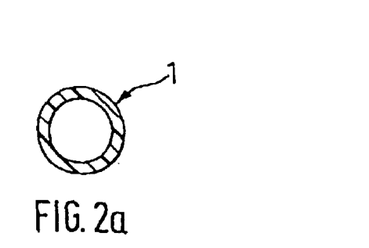
FIG. 2 cross-sections of preforms.
Figure 2B:
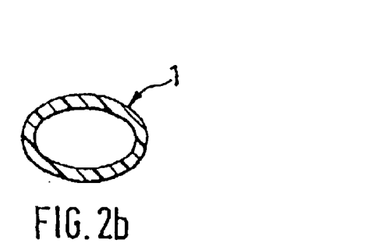

According to the embodiments shown in FIG. 2 the preforms 1 may have an annular or oval cross-section. Moreover, angular, e.g. triangular or polygonal cross-sections—preferably with rounded corners—are conceivable (not shown). Furthermore, uniform, but also varying wall thicknesses may be provided over the entire cross-section. It is possible, for example, to manufacture a container having an oval cross-section and uniform wall thickness from a preform having a round cross-section and non-uniform wall thicknesses.

Figure 3A:
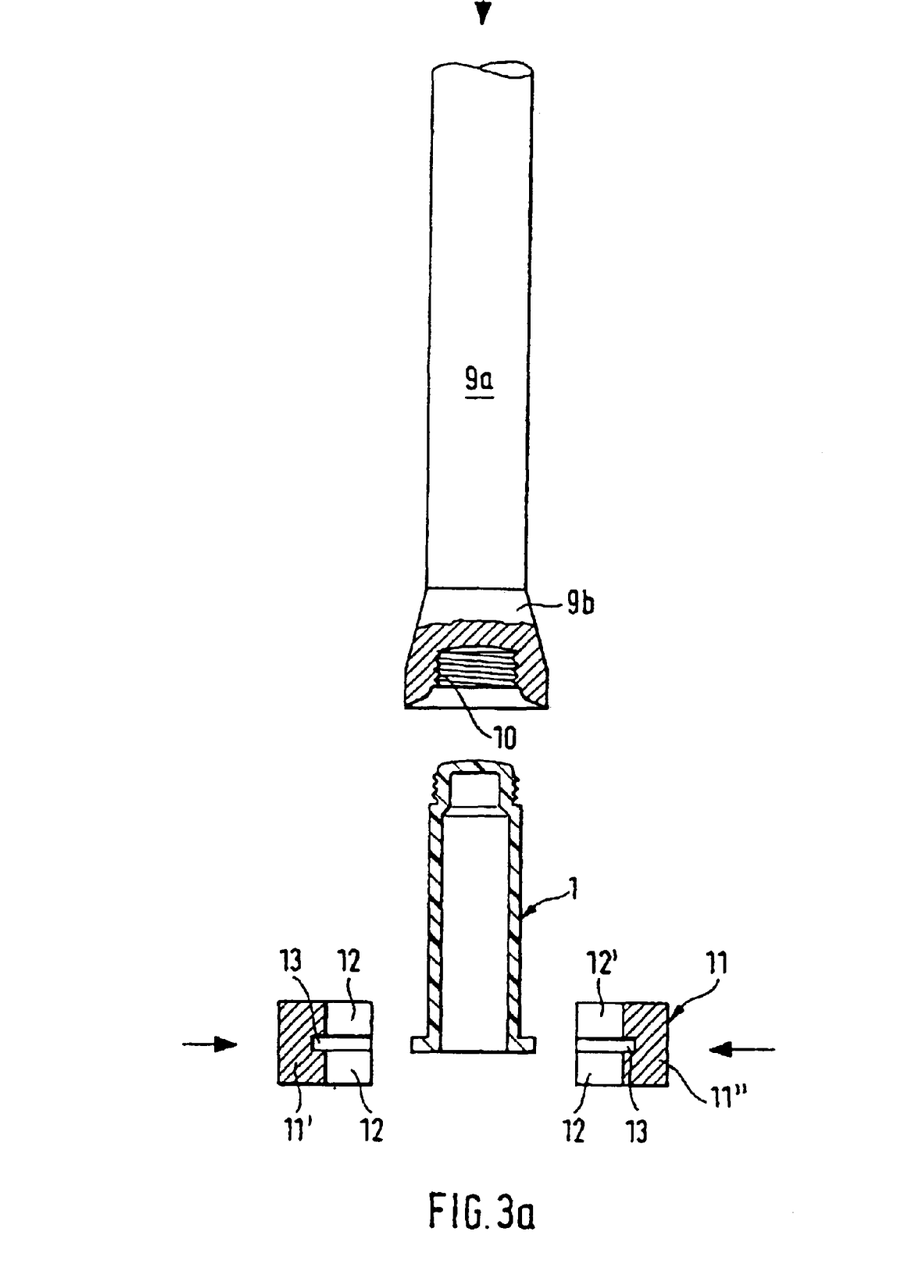
FIG. 3 the connection of a preform to various drawing heads.
Figure 3B:
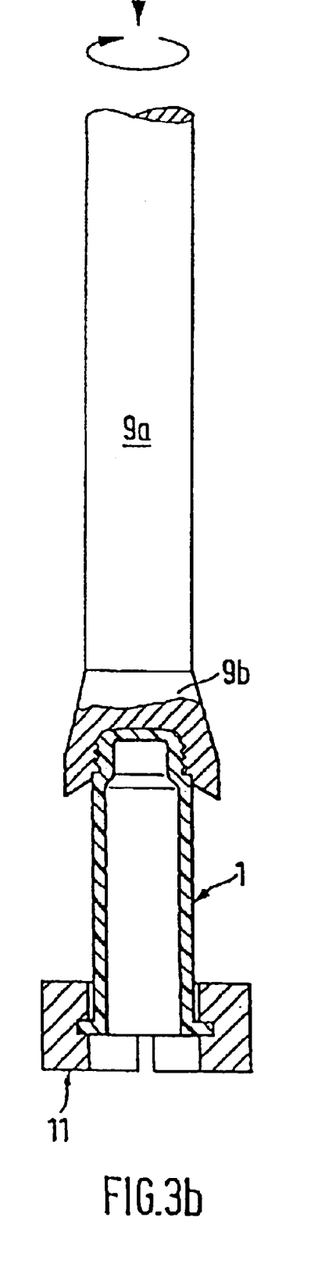
Figure 3C:
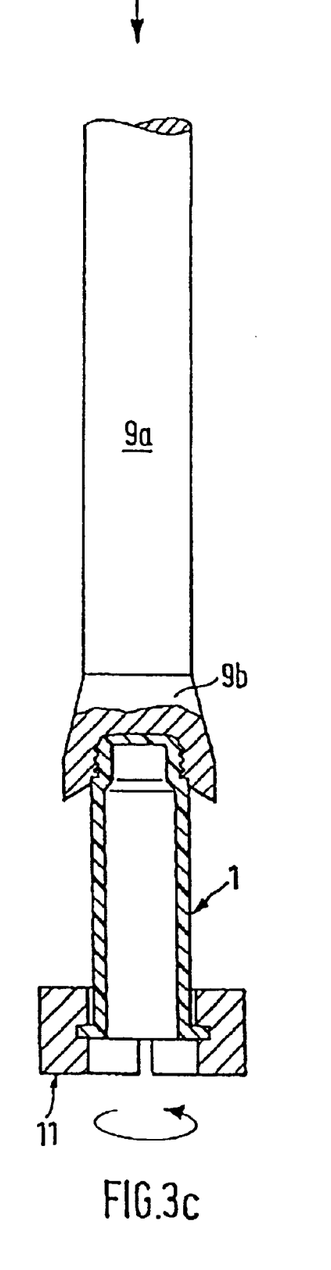

FIG. 3a shows a preform 1 according to FIG. 1a to which a tie bar 9a comprising a drawing head 9b as well as a support 11, split into two parts are fed; the latter may also serve for absorbing the torques during a screwing procedure. In this embodiment the drawing head 9b comprises an internal thread 10 corresponding to the external thread 5 of the neck 4. The support 11 comprises a central aperture 12, 121, which correspond to the outer diameter of the tubular body 2 of the preform 1. Inside the support halves 11', 11" an annular groove 13 is provided, serving to accommodate the flange 6 of the preform 1. In FIGS. 3b and c possible connections of a preform 1 to a drawing head 9b are shown, in which case, according to FIG. 3b, the preform 1 is arranged rigidly and the drawing head 9b in a rotatable manner and, according to FIG. 3c, the drawing head 9b is arranged in a non-rotatable manner while the preform 1 with the support 11 is rotatable.

Figure 4A:
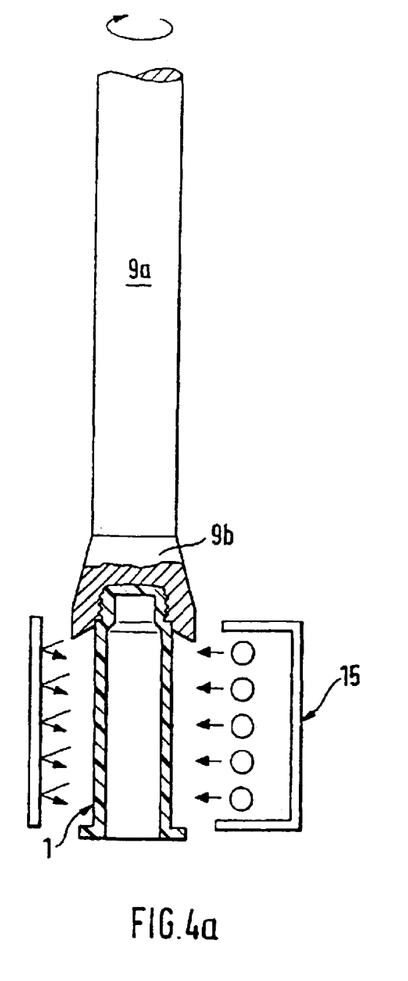
FIG. 4 heating of a preform by radiant heat and hot air.
Figure 4B:
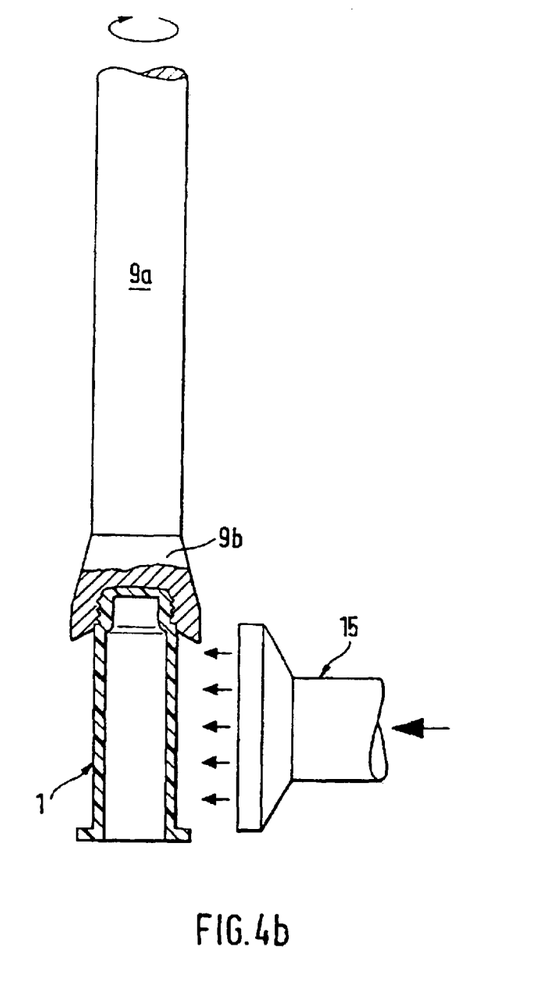

Each preform 1 fitted to a drawing head 9b is then fed to a heating device 14 which may also be a heating chamber (see FIGS. 4a and b), which may be of optional design.

Radiant heat (e.g. infra-red radiation) is used as the preferred source of heating, however, the use of, for example, hot air, ultrasound or microwaves is likewise possible, in which context heating of the tubular body 2 of a preform 1 may be performed as uniformly or non-uniformly as desired with respect to height and circumference.

Figure 5:
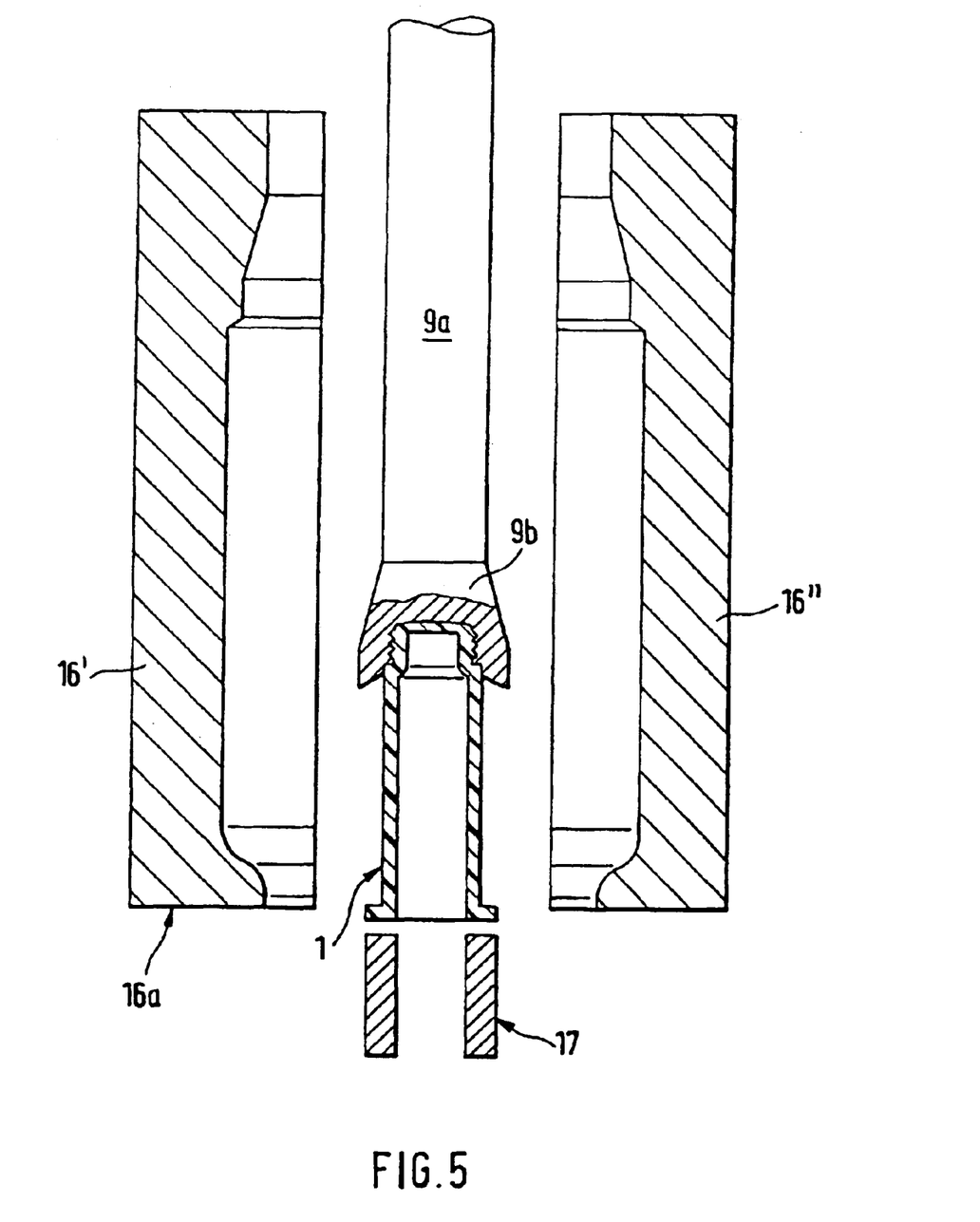
FIG. 5 introducing a preform into an open blow mould by way of a drawing head and feeding a blowing air nozzle, FIG. 6 closing the blow mould with subsequent moving of a blow nozzle against the open end of the preform, FIG. 7 stretch-drawing and pre-blowing of a preform, FIG. 8 stretch-drawing and blowing of preforms with and without flange, FIG. 9 venting or evacuating the finished container remaining in the blow mould, FIG. 10 opening the blow mould and removing the blow nozzle, FIG. 11 two embodiments for removing the incompletely formed end portion of a finished tubular container, in which context in one embodiment a passage in the tube neck is manufactured simultaneously with the removal of the end portion, FIG. 12 the removal of the finished container from the drawing head, FIG. 13 embodiments of tubular containers in a side elevation and cross-sections thereof.

The heated preform 1 fitted to the drawing head 9b is fed into the interior of a blow mould 16, split into two parts in the embodiment (see FIG. 5), the blow mould halves 16', 16" making it possible in the closed state (see FIG. 6) for the flange 6 of the preform 1 to derive support from the lower outer end of the closed blow mould 16. To the lower open end 5 of the supported preform 1, sealed in relation to the flange 6, a blow nozzle 17 is fitted, the diameter of which is preferably adapted to the diameter of the tubular body 2.

Figure 6:
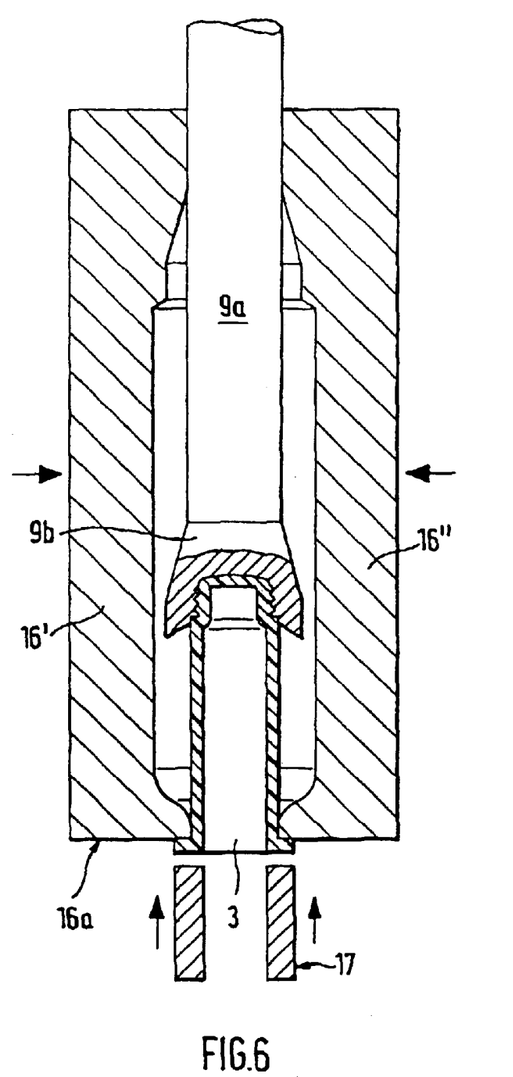

As can be seen in FIG. 6, the inner upper end of the closed blow mould 16 is adapted accordingly to the outer configuration of the drawing head 9b, i.e. the drawing head 9b forms a portion of the blow mould 16 in its final upper position.

Figure 7:
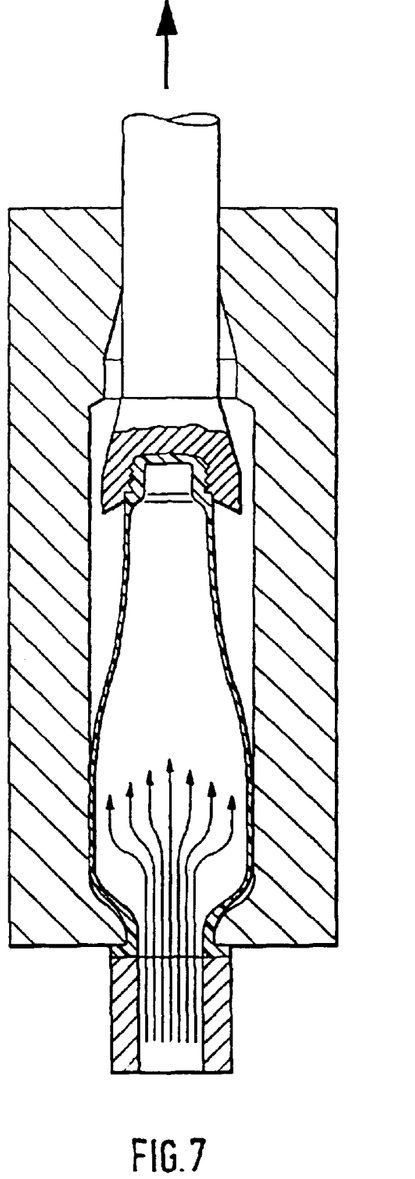

FIG. 7 shows a transitional stage of the process of stretch-drawing by means of the upwardly moving drawing head (see arrow) and by supplying compressed air (under preblow-pressure).

Figure 8:
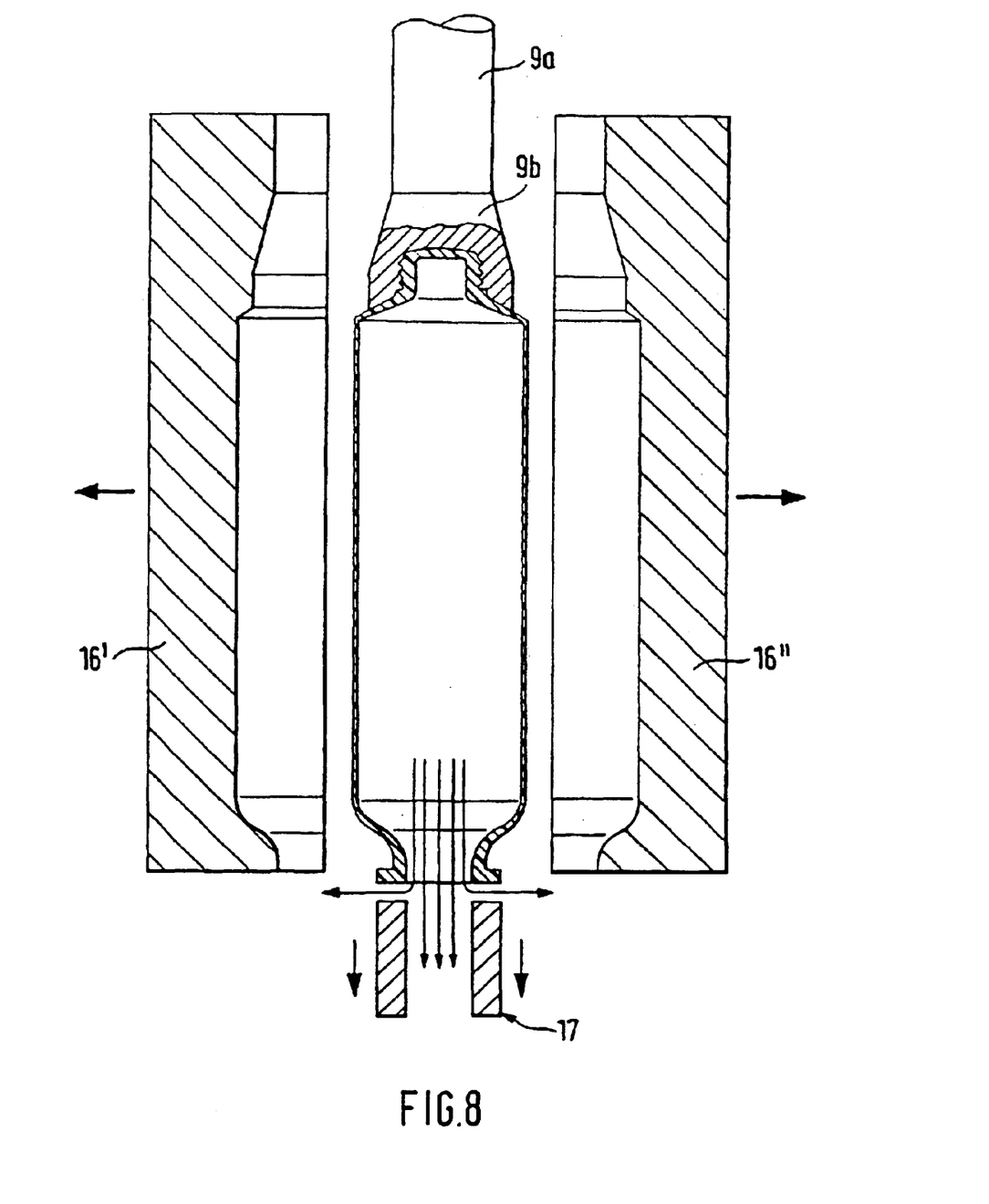
Figure 8A:
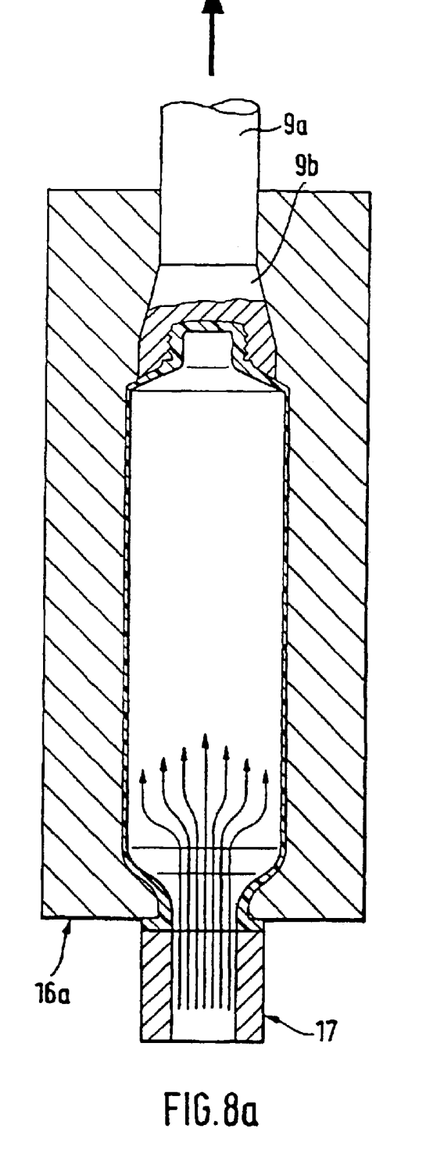
Figure 8B:
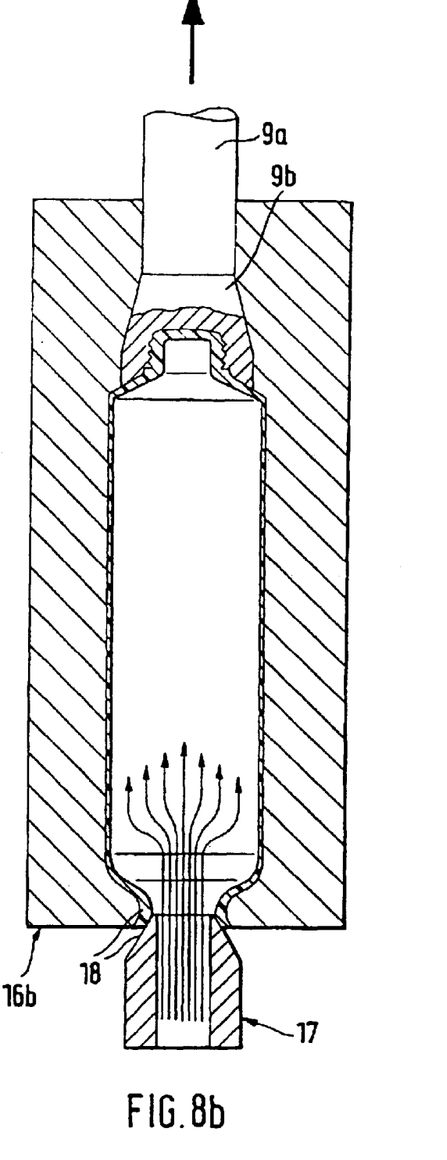

In FIG. 8 pulling of the tie rod 9a, by which the drawing head 9b is brought into its final upper position forming a portion of the blow mould 16 and stretching of the preform into the final shape, predetermined by the blow mould 16a, by feeding blowing air at a pressure which is preferably elevated in relation to the preblow pressure, has already taken place. In FIG. 7b a blow mould 16b comprising a lower region 19, designed to open conically towards the outside, is provided, serving to clamp the lower open end 3 of a preform 1 even without a flange by way of an accordingly conically designed outer configuration of a blow nozzle 17' so that during pulling of the drawing head 9b in the direction of the arrow the lower open end 3 of the preform 1 may likewise be maintained in a reliably clamped, fixed position.

Figure 9:
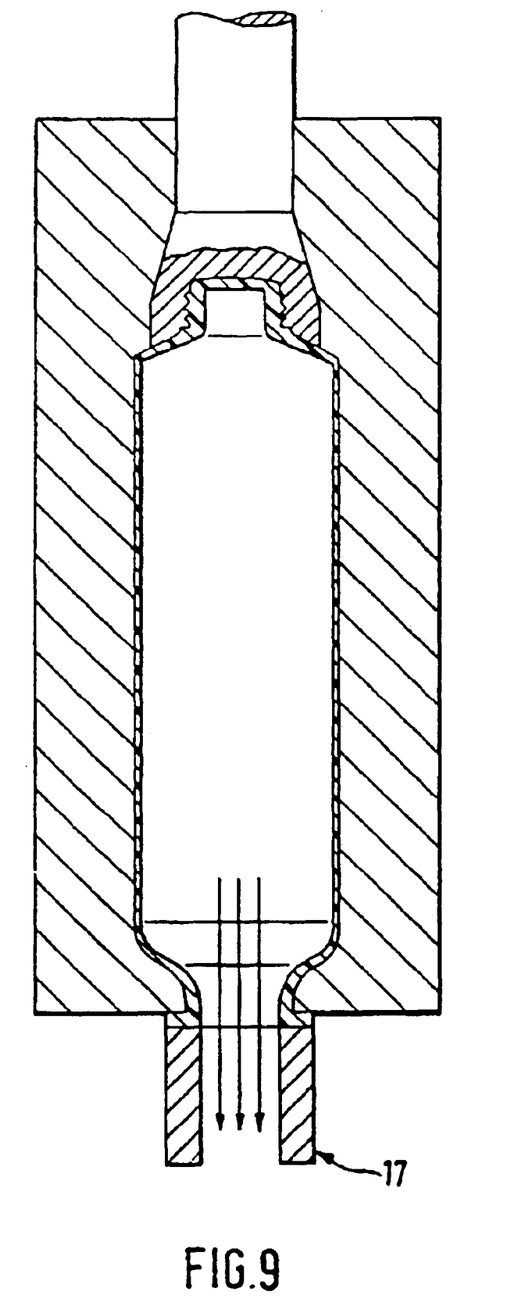

FIG. 9 shows venting or evacuating of the finished formed container blank, which is performed by the blow nozzle 17 remaining connected until (see the arrows) the internal pressure is reduced.

Figure 10:
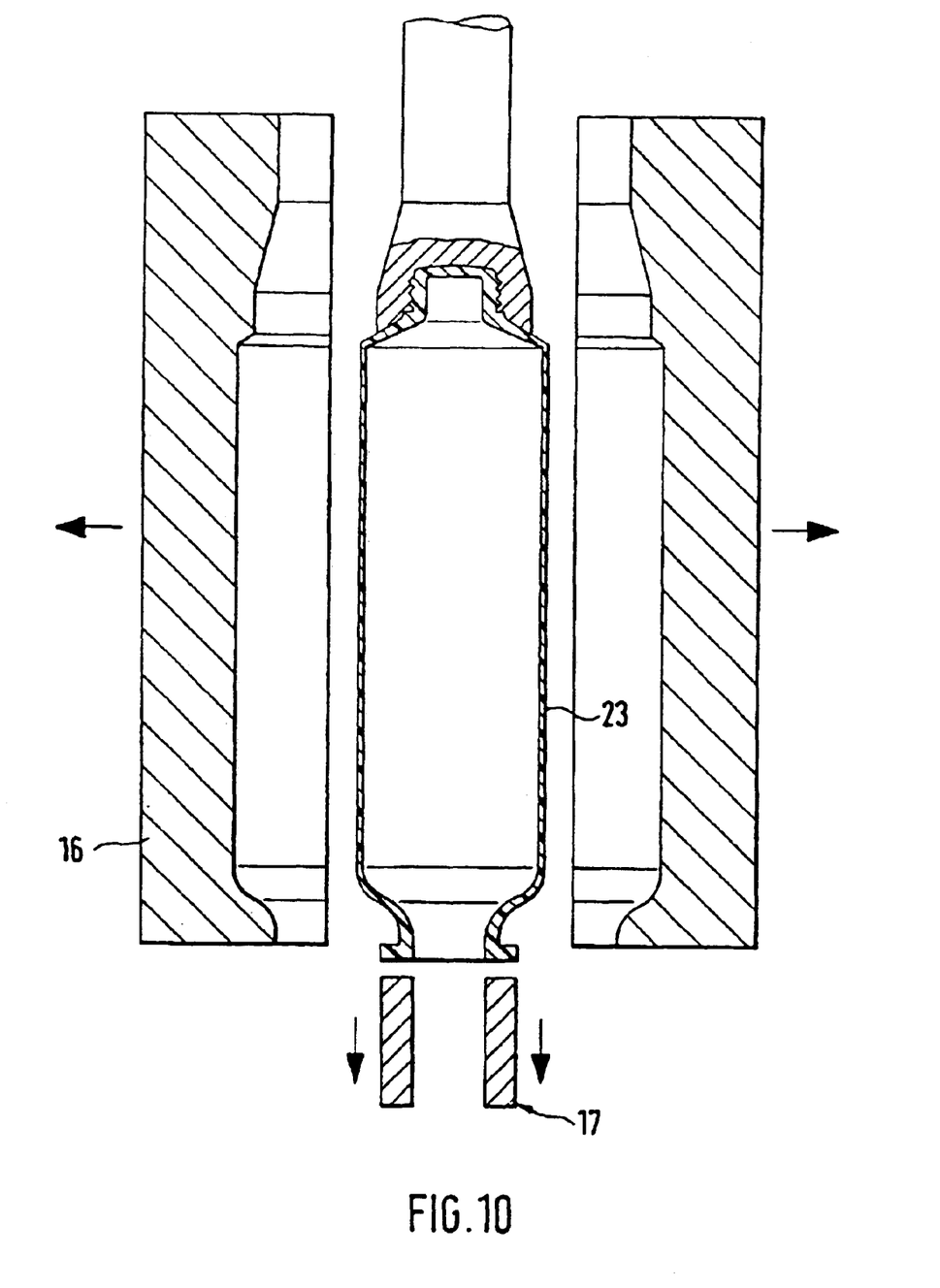

FIG. 10 shows the opening of the blow mould 16 and the removal of the blow noble 17, atmospheric pressure being present again in the interior of the shaped container 23 due to the preceding venting process.

The finished container comprises an end portion 19 at the lower end which is not completely inflated or stretched and which does not have the desired final dimensions of the container produced. This "incompletely" formed end portion 19 is separated off by using a knife 20 (see FIG. 11a) or a laser beam 21 (see FIG. 11b). By way of this cut the finished container 23 may also obtain the relevant desired length. A laser beam 21, using a mirror 22, permits producing a discharge aperture 7 (broken arrow) simultaneously with separating off the end portion 19, even in a sealed neck, or first producing a discharge aperture 7 and then cutting off the end portion 19 (drawn out arrow). The same applies analogously to an opening in a preform 1 having a discharge nozzle 8 (see FIG. 1d).

Figure 12A:
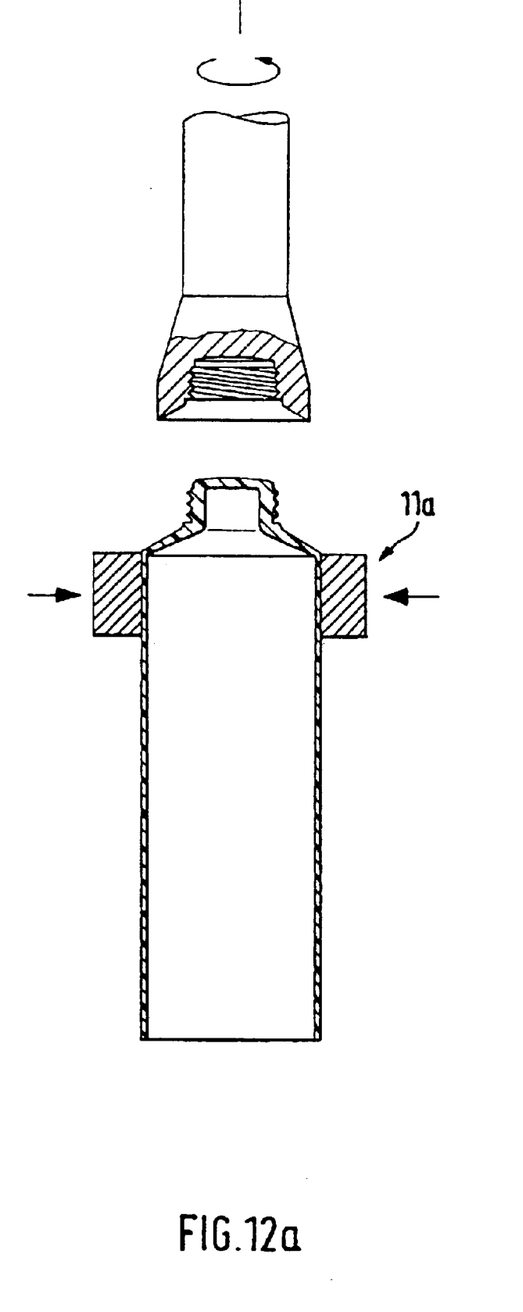
Figure 12B:
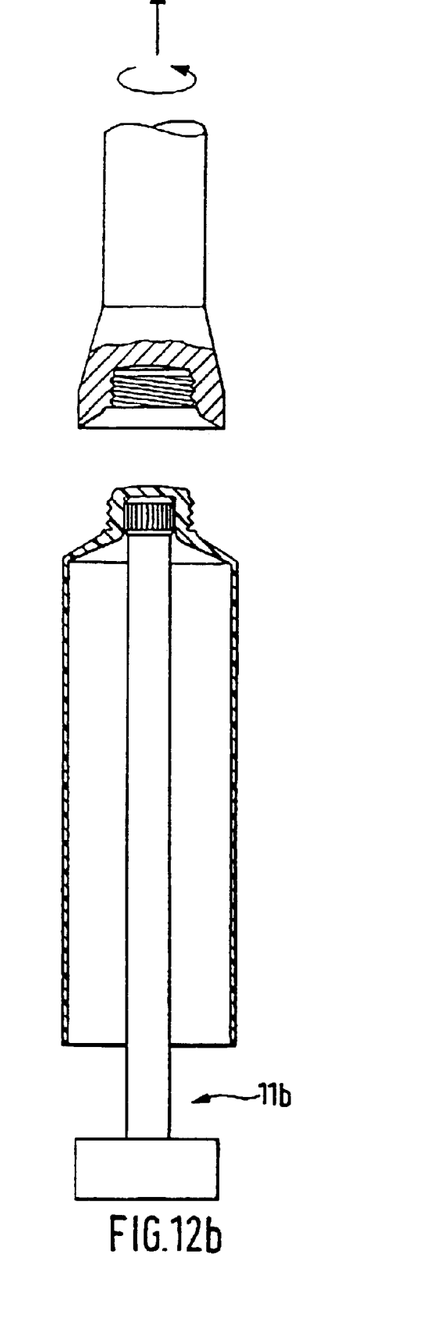
Figure 13A:
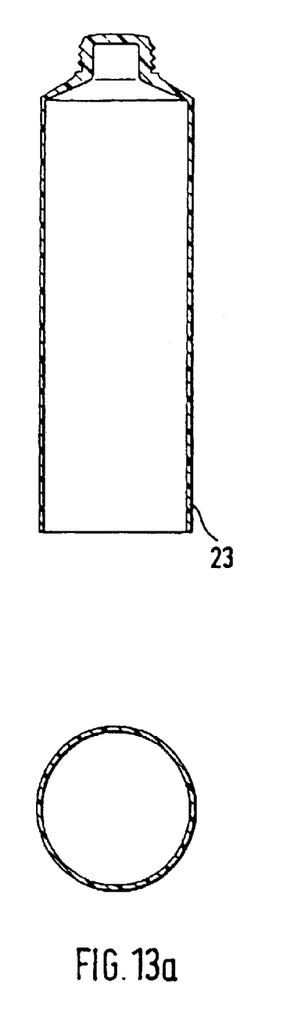
Figure 13B:
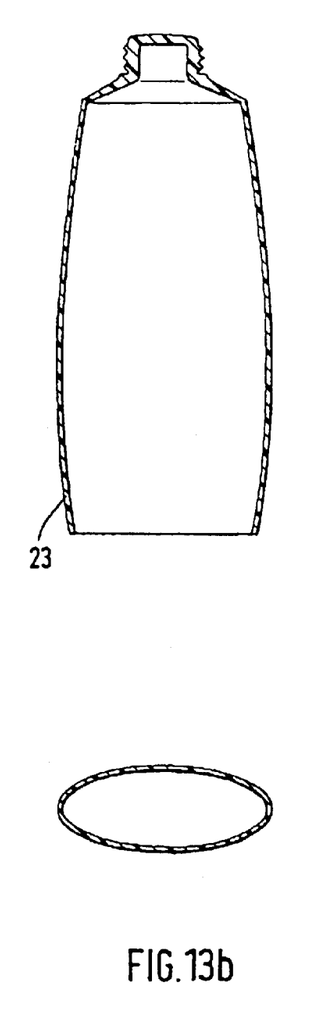
Figure 13C:
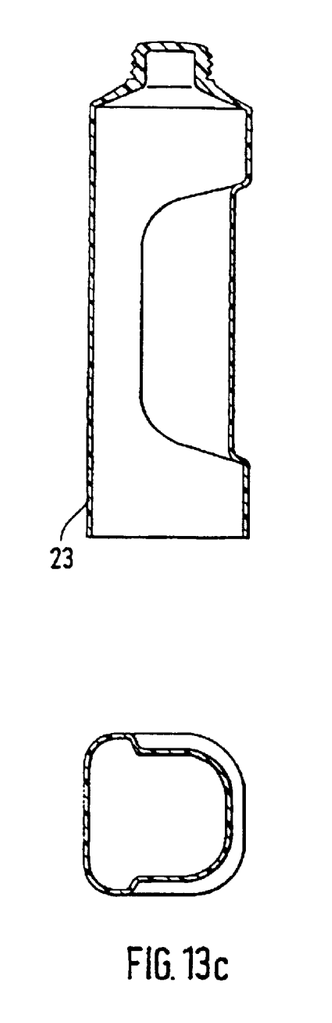

In a further step the finished container 23 is removed from the drawing head 9b by relative rotation between the drawing head 9b and the container 23 produced or, respectively, by opening of the claws 14, in which context a support 11a in the form of two closable holding jaws (see FIG. 12a) or a support 11a in the form of a retaining rod inserted into the interior of the container (see FIG. 12b) may be provided for absorbing torques, the said support serving to prevent the simultaneous turning of the container.

Figure 11A:
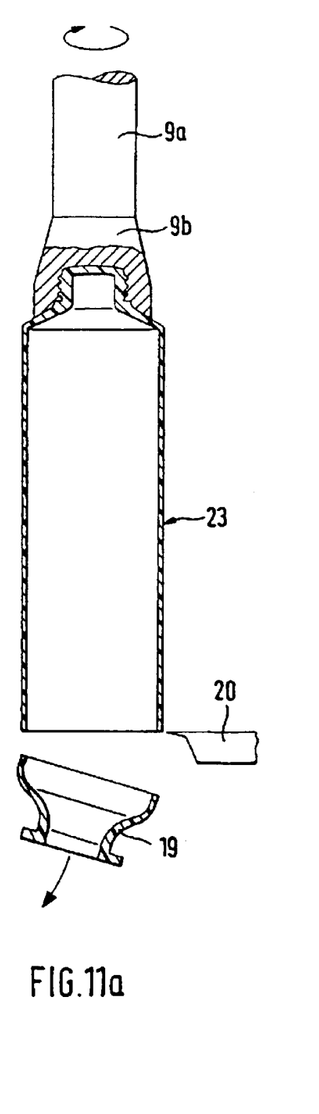
Figure 11B:
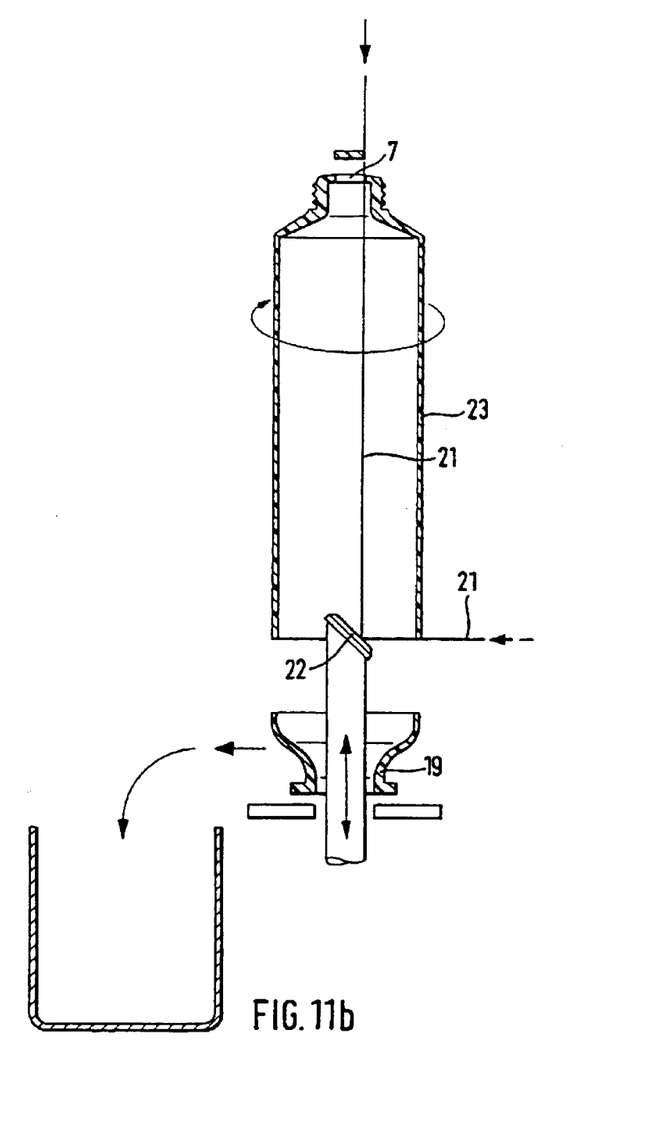

FIG. 11 shows three different shapes of tubular containers 23 as well as three conceivable cross-section shapes. FIG. 11a shows a tubular container having a circular cross-section, FIG. 11b a bulging, tubular container of oval cross-section having different cross-sections over its height and FIG. 11c an angular container with rounded off corners and a recessed grip formed over its height having an angular cross-section. These few examples merely serve to demonstrate that with the new process any shape of containers and cross-sections, even using bulges, convex or concave reliefs with gripping concavities etc. may be produced which broadens the field of application remarkably in relation to known methods for the production of tubular containers.

Materials such as PET=polyethylene terephthalate, PEN—polyethylene naphthalate, PEP=polypropylene and mixtures of PET/PEN are suitable for carrying out the process, the enumeration of materials not being conclusive.

There exists further the possibility to introduce one or more labels into the open blow mould 16a, b, which eventually are permanently connected to the finished container 23, whereby a separate labelling step is obviated.

In the following a concrete working example for the production of a tube made of PET—polyethylene terephthalate having a diameter of 50 mm and a length of 200 mm is described. The respective preforms having a diameter of 28 mm, a wall thickness of 3 mm and a height of 66 mm with or without bulges are heated to 90–100° C., more specifically only in the regions where they have to be stretched and blown. The stretch-forming is performed at a velocity of 0.3–0.5 m/sec., a preblow pressure of 3 to 10 bar being adhered to by feeding blowing air through the blow nozzle 17. Subsequently the tight fitting of the preform against the wall of the blow mould 16a; 16b is brought about by an increased blow pressure of 30 to 40 bar. Simultaneously the blow mould 16a; 16b is cooled to approximately 10° C., the cooling time corresponding to the action time of the blow pressure at 30 to 40 bar. It is about 0.8 to 1.2 sec. Venting of the finished tube takes about 0.3 to 0.4 seconds, the result being that a wall thickness of the finished tube of 0.15 to 0.4 mm is attained.

What is claimed is:

1. Process for producing containers (23) by separately producing a preform (1) including a neck (4) having final dimensions and a tubular body (2) having smaller dimensions than the intended final form, heating the preform (1), fitting the preform (1) to a drawing head (9b) in the neck region, introducing the preform (1) together with the drawing head (9b) into the interior of a multi-part closable blow mould (16a; 16b), axial drawing of the preform (1) by means of the drawing head (9b) and expanding the preform (1) by supplying blowing air into the interior, hardening the container closely fitting against the wall of the blow mould (16a; 16b), opening the blow mould and removing the container, characterised in that for producing a tubular container (23) the preform (1) comprises a closure at the one end and an open filling opening (3) with an externally situated, projecting flange (6) at the other end and that the preform (1) is connected to the drawing head (9b) in a rotatable manner relative to one another, the supply of blowing air taking place by means of a blow nozzle (17) arranged in a sealed manner at the open end of the filling opening (3) and that the incompletely inflated or, respectively, stretched lower end portion (19) of the produced container (23) is separated off or cut to length.

2. Process for producing tubular containers (23) according to claim 1, characterised in that the preform (1) is provided with a discharge aperture (7) in the neck (4).

3. Process for producing tubular containers (23) according to claim 1, characterised in that the discharge aperture (7) is produced after completion of the container form.

4. Process for producing tubular containers (23) according to claimed 1, characterised in that separation of the in completely formed end portion (19) is performed by a knife (20).

5. Process for producing tubular containers (23) according to claim 1, characterised in that separation of the incompletely formed end portion (19) is performed by laser beams (21).

6. Process for producing tubular containers (23) according to claim 3, characterised in that the production of the discharge aperture (7) and the separation of the incompletely formed end portion (19) is performed in one step by means of laser beams (21) using deflection optics.

7. Process for producing tubular containers (23) according to claim 1, characterised in that the neck (4) is fixable to an internal thread (10) of the drawing head (9b) by way of an external thread (5).

8. Process for producing tubular containers (23) according to claim 1, characterised in that heating takes place non-uniformly over the height and/or the circumference of the preform (1).

9. Process for producing tubular containers (23) according to claim 1, characterised in that heating of the preform (1) takes place by radiant heat and/or hot air and/or ultrasound and/or microwaves.

10. Process for producing tubular containers (23) according to claim 1, characterised in that the axial drawing is performed with feeding blowing air in two stages by pre-blowing at a pressure of 3 to 10 bar and subsequently at an increased blowing pressure of 30 to 40 bar.

11. Process for producing tubular containers (23) according to claim 10, characterised in that after the drawing head (9b) has attained the final position in the blow mould (16a; 16b) the blowing pressure is increased up to 40 bar.

12. Process for producing tubular containers (23) according to claim 1, characterised in that a label is introduced into an open blow mould (16a; 16b).

\* \* \* \* \*

UNITED STATES PATENT AND TRADEMARK OFFICE
CERTIFICATE OF CORRECTION

PATENT NO. : 6,852,267 B1
DATED : February 8, 2005
INVENTOR(S) : Keller

It is certified that error appears in the above-identified patent and that said Letters Patent is hereby corrected as shown below:

Column 5,
Line 5, after the word "to", please change "claim 1" to correctly read -- claim 2 --.
Line 8, after the word "to", please change "claimed" to correctly read -- claim --.

Signed and Sealed this

Tenth Day of May, 2005

JON W. DUDAS
*Director of the United States Patent and Trademark Office*